United States Patent
Costa et al.

(10) Patent No.: US 7,517,184 B2
(45) Date of Patent: Apr. 14, 2009

(54) LOW DEFLECTION FAN CASE COTAINMENT FABRIC

(75) Inventors: Mark W. Costa, Storrs, CT (US); Jan B. Kowza, Coventry, CT (US); Curt R. Hetherington, Newington, CT (US); Wendy P. Lopardi, Tolland, CT (US); Douglas Welch, Portland, CT (US)

(73) Assignee: Unied Technologies Corporation, Hartford, CT (US)

( * ) Notice: Subject to any disclaimer, the term of this patent is extended or adjusted under 35 U.S.C. 154(b) by 377 days.

(21) Appl. No.: 11/444,562

(22) Filed: Jun. 1, 2006

(65) Prior Publication Data
US 2007/0280817 A1    Dec. 6, 2007

(51) Int. Cl.
F01D 25/24    (2006.01)
(52) U.S. Cl. .................. 415/1; 415/9; 415/200
(58) Field of Classification Search .......... 415/1, 415/9, 200; 60/39.091
See application file for complete search history.

(56) References Cited

U.S. PATENT DOCUMENTS

| 4,490,092 | A |   | 12/1984 | Premont |
| 4,546,032 | A | * | 10/1985 | Vasilos ...................... 428/223 |
| 5,516,257 | A |   | 5/1996  | Kasprow et al. |
| 5,624,790 | A | * | 4/1997  | Trokhan et al. ............. 430/320 |
| 6,059,524 | A | * | 5/2000  | Costa et al. ..................... 415/9 |
| 6,652,222 | B1| * | 11/2003 | Wojtyczka et al. ............. 415/9 |
| 2004/0048022 | A1 | * | 3/2004 | Pratt ....................... 428/36.91 |
| 2006/0284337 | A1 | * | 12/2006 | Subramanian et al. ...... 264/258 |

* cited by examiner

*Primary Examiner*—Ninh H Nguyen
(74) *Attorney, Agent, or Firm*—Kinney & Lange PA

(57) ABSTRACT

A turbine engine fan casing for containing a separated blade fragment comprising a support case having an axially extending impact zone, a substantially structurally continuous penetrable covering circumscribing the impact zone; and a containment covering circumscribing the penetrable covering. The containment covering comprises a textile fabric containing threads in a warp direction and a fill direction, wherein the threads in the warp direction are of a different denier than the threads in the fill direction.

12 Claims, 2 Drawing Sheets

LOW DEFLECTION FAN CASE COTAINMENT FABRIC

BACKGROUND OF THE INVENTION

The current invention relates to fan casings for gas turbine engines for aircraft, particularly to penetration resistant fan casings for containing fragmented engine parts.

Jet aircraft are powered by propulsion system, which includes a gas turbine engine housed within an aerodynamically streamlined nacelle. The typical engine includes a fan section with a rotatable hub connected to an array of fan blades projecting radially from the hub, and a fan case encircling the blades. In operation, engine parts (particularly portions of the fan blade) may become separated from the hub, which may include all or a portion of the blade becoming separated from the remainder of the blade. Fan casings are designed to contain the fragmented pieces within the casing.

Particularly in large diameter engines, a metallic case thick enough to resist penetration is prohibitively heavy. As such, the engines are often equipped with a containment structure, which includes a fabric wrapped around engine parts. The fabric is often a light-weight, high strength ballistic fabric such as Kevlar® (a trademark of E.I. Dupont de Nemours & Company). The containment fabric is wrapped in multiple layers around a relatively thin, often penetrable supporting case. Thus, the portion of the blade becomes separated from the rest of the engine, the fragment penetrates the support case and strikes the fabric. The fabric deflects radially, and at least some of the fabric layers remain intact to capture and contain the fragment.

Containment systems which include fabric are more weight efficient than metallic containment cases, but nonetheless add considerable weight to the engine. The fabric must be designed to be light-weight, but to maintain its durability. If the fabric deflects excessively, the fragmented engine part can strike or damage the interior of the nacelle, resulting in a pierced fabric. Thus, it is desirable to have a fabric that is durable but within minimized weight that will not compromise containment capability or risk damage to the nacelle.

BRIEF SUMMARY OF THE INVENTION

The current invention relates to a turbine engine fan casing for containing a separated blade fragment and a method for construction the fan casing. The fan casing comprises a support case having an axially extending impact zone, a substantially structurally continuous penetrable covering circumscribing the impact zone; and a containment covering circumscribing the penetrable covering. The containment covering comprises a textile fabric containing threads in a warp direction and a fill direction, wherein the threads in the warp direction are of a different denier than the threads in the fill direction.

DETAILED DESCRIPTION

Figure 1:
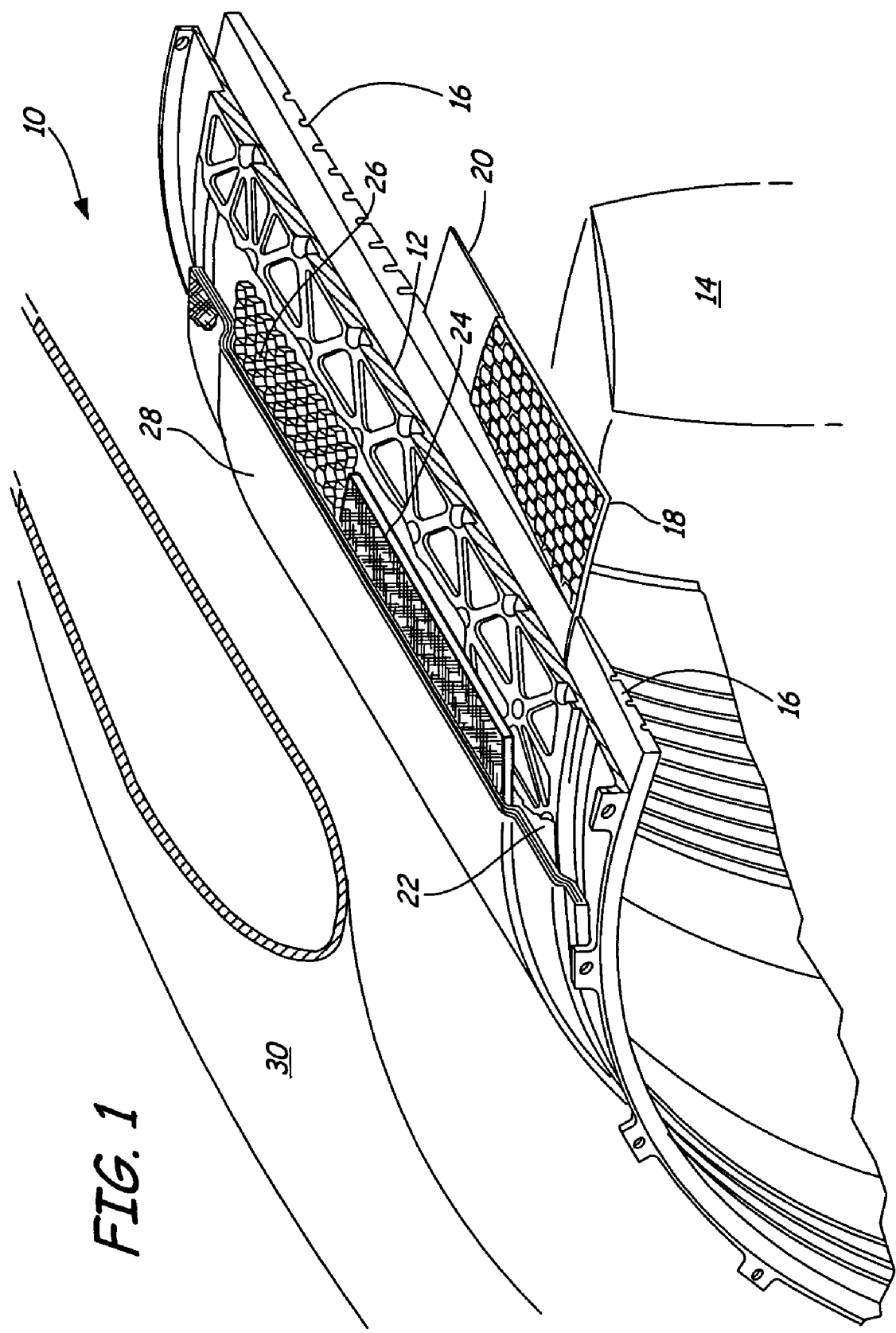
FIG. 1 is a cutaway perspective view showing a portion of a penetration resistant fan casing.

FIG. 1 is a cutaway perspective view illustrating a portion of a penetration resistant fan casing. Illustrated in FIG. 1 are fan casing 10 and blade 14. Fan casing 10 compromises ribbed aluminum support case 12, noise attenuation panels 16, abraidable rub strip 18, ice shield 20, aluminum face sheet 22, penetrable covering 24, support covering 26, penetration resistant containment covering 28, and streamlined nacelle 30. Abraidable rub strip 18 extends actually between noise attenuation panels 16 upward of the fan blade 14. The tips of blade 14 carve a trench (not shown) into rub strip 18, and thereafter the tips of blade 14 extend into the trench during engine operation to minimize air leakage around the blade tips. Ice shield 20 protects noise attenuation panels 16 from impact damage due to any accumulated ice cast off by blade 14 during operation.

Penetrable covering 24 is a continuous belt of aromatic polyamide fiber fabric such as Kevlar® wrapped around support case 12. The light-weight support covering 26 is a collapsible covering such as a phenolic coated, fibrous aramide based cellular array. Penetration resistant containment covering 28 circumscribes both penetrable covering 24 and support covering 26. The containment covering 28 is a continuous belt of aromatic polyamide fiber fabric such as Kevlar®, preferably oriented with the warp fibers extending circumferentially and the fill fibers extending axially.

The properties of the containment fabric 28 may differ from those of a penetrable fabric 24. The containment fabric 28 contains forward and aft ends situated axially beyond penetrable fabric 24 and collapsible covering 26. The ends of containment fabric 28 are anchored to support case 12 by circumferentially continuous joints effected by an epoxy adhesive bonding agent. The joints prevent containment fabric 28 from creeping axially out of place during engine assembly and operation. A thin coating of the bonding agent can also be applied to the outer most surface of containment fabric 28 and cured to form a moisture repellant skin. The skin is an environmental seal that guards against water infiltration to containment fabric 28 and penetrable fabric 24. Absent the seal from the skin, penetration fabric 24 and containment fabric 28 can absorb and retain significant amounts of water, thus detrimentally adding to the engine weight.

The above described fan casing is designed to withstand the impact of engine fragments, which may compromise substantially the entire blade, ejected when the fan is operating at a higher rotational speed. Such a blade fragmentation opens a rupture in a support case and face sheet. The fragment then penetrates penetrable fabric 24, which causes the fragment to buckle or otherwise deform so sharp edges on the fragment are blunted and the surface area of the fragment in contact with the fabric is increased. Thus, penetrable fabric 24 preconditions the fragment to reduce its potential for inflicting damage to containment fabric 28.

Upon the deformed fragment piercing penetrable fabric 24, the fragment is intercepted by penetration resistant containment fabric 28. A fragment typically cuts through many or most of the containment fabric layers; however, at least one of the layers remains intact. Intact layers elongate and deflect radially outward to intercept and confine the deformed fragment to a predetermined radial envelope bounded by the inner surface of nacelle 30. As a result, the fabric enshrouded fragment is prohibited from striking and damaging the nacelle. The penetration resistance of containment fabric 28 is enhanced by collapsible cellular array 26. When an engine fragment strikes containment fabric 28, the fabric acts a medium for transferring some of the impact force into cellular array 26. The transferred force crushes the cellular array by flattening subwalls against the support case, which limits the ability of the cellular array 26 to radially support the containment fabric 28. The loss of radial support briefly introduces some slack into containment fabric 28, which momentarily detentions the fabric thus improving the penetration resistance of containment fabric 28.

Containment fabric 28 and penetrable fabric 24 are textile fabrics. In the making of textile fabric, two sets of threads crossing each other at approximately right angles are utilized. The longitudinal threads (also referred to as fibers or yarns) in a loom are colloquially known as the warp, and the transverse threads are referred to as the weft or fill threads. The thickness of a thread is referred to as the denier of a thread. In the existing art, the penetrable containment fabrics are constructed with a symmetric weave that contains the same fiber denier, i.e. weight and thickness of yarn, in both the warp and fill directions. Typically, the present convention in the art uses a either a Kevlar 29 or Kevlar 49 aramid fiber in a balanced weave (equal number of warp and fill yarns per inch).

Figure 2:
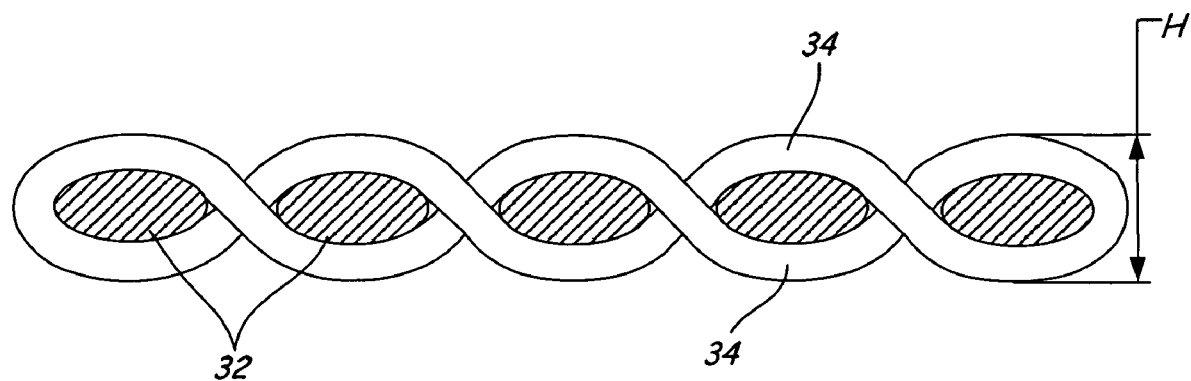
FIG. 2 is a cross-sectional view of a portion of a textile weave used in the prior art.

FIG. 2 illustrates a cross-section of a portion of a textile weave used in a typical engine containment fabric. Both warp threads 32 and fill threads 34 are shown. Warp threads 32 are in cross section, while fill threads 34 are shown parallel to the cross section. Both fill threads 34 and warp threads 32 are of the same denier. The overall textile weave has a height H. In one embodiment, the weave contains approximately 17 threads per inch for both the fill and warp directions. The fibers in both the fill and warp directions are ovular in cross section due to the loading of the fibers during the weaving process.

Figure 3:
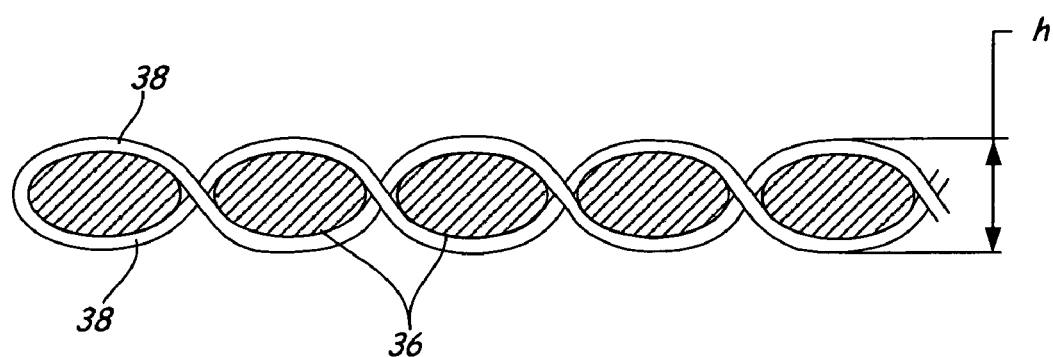
FIG. 3 is a cross-sectional view of a portion of a textile weave of the current invention.

FIG. 3 illustrates a cross-section of a portion of a textile weave of the current invention. In this weave, warp threads 36 and fill threads 38 are both shown. Both threads are made from aramid fiber or similar aromatic polyamide fiber. Fill threads 38 are of a different denier than warp threads 36. The result is a flatter weave, having a height h that is considerably less than the height H of the weave illustrated in FIG. 2.

The current invention seeks to reduce the weight of the containment system of the engine by reducing the weight of the containment fabric and/or penetrable fabric. The containment fabric and penetrable fabric are each a textile, made from such material as an aromatic polyamide fiber thread. The present invention is a weave that contains varying size deniers for the warp and fill directions of the fabric weave. The fabric is wrapped so that the warp fibers travel circumferentially around the case. Thus, it is preferred that the warp fibers be of a larger thread denier to provide maximum impact resistance. Similarly, the fill fibers are preferred to be of a smaller thread denier to minimize the overall height of the fabric. The fill threads add structure to the weave to keep the warp threads in the weave, but minimally absorb or otherwise affect the force of a fragment as previously described.

In one embodiment, the weave of the current invention contains more threads per inch in the fill direction than in the warp direction, while in another embodiment the weave is balanced (i.e. the same number of threads in both the warp and fill directions). The weave may be a plain weave, which is one fill thread to one warp thread, or may be of any other weave such as twill or satin or hybrids thereof, suitable to obtain the desired properties for containment of fragments as previously described.

The fabric is wrapped around support case 12 in a specified manner and for a specified number of times to achieve the desired containment properties for the particular application. In an exemplary embodiment, the fabric is wrapped continuously around the support case a minimum of five times.

In one embodiment, the containment fabric is a 24 by 24 (yarns per inch) plain weave constructed with warp threads that are approximately five times larger in diameter that the fill threads. In other embodiments, the warp yarn has a diameter that is at least twice the diameter of the fill yarn, or has a diameter which is fifty percent larger that the diameter of the fill yarn. The weave of the textile for the containment fabric is preferably a balanced weave, but may be unbalanced with more threads per unit length in either the warp or fill direction.

The invention adopts a lower weight denier yarn in the fill direction, which results in a flatter warp yarn for a given length of weave, but still maintains essential properties in the critical warp direction. During a containment event, the warp yarns will stretch considerably less before becoming fully loaded, and subsequently the fabric deflection prior to and during the loading of the individual warp fibers is reduced significantly. The thickness of the woven cloth is reduced per unit weight, resulting in a more compact wrap of containment fabric about the containment structure.

By reducing the overall deflection of the containment system, the nacelle structure is allowed to be positioned radially closer to the engine casing. The reduced radial clearance translates into a nacelle structure that is smaller in diameter, which produces less drag and a lighter system. The reduction in weight, size, and drag contribute to a more fuel efficient power structure. The inventive fabric may be used as both a penetrable fabric and containment fabric for an engine.

The inventive textile allows for a method of containing a separated fan blade fragment in a turbine engine as described above. First, the penetrable covering (such as 24 of FIG. 1) will precondition the separated blade to reduce its potential for inflicting damage. The penetration covering acts to plastically deform the fragment. The penetration covering is wrapped around the support case with substantially no tension to maximize the penetration resistance of the penetration covering. Next, the containment covering intercepts the preconditioned fragment. The containment covering comprises a textile fabric made from aromatic polyamide fibers that contain differing thread deniers in the warp and fill directions as previously described. The containment covering prevents the fragment from passing through the textile and damaging the nacelle. The containment fabric is installed with a positive tension to prevent excessive deflection which would allow a fabric enshrouded fragment to strike the nacelle. During a containment event, the tensioned containment covering at least partially detensions to absorb the energy of the impact. The containment covering is installed in a series of successive layers around the fan casing, with a minimum of five layers used.

Although the present invention has been described with reference to several defined embodiments, workers skilled in the art will recognize that changes may be made in form and detail without departing from the spirit and scope of the invention.

The invention claimed is:

1. A turbine engine fan casing for containing a separated blade fragment, comprising:
    a support case having an axially extending impact zone;
    a substantially structurally continuous penetrable covering circumscribing the impact zone; and
    a containment covering circumscribing the penetrable covering, the containment covering comprising:
        a textile fabric containing threads in a warp direction and a fill direction, wherein the threads in the warp direction are of a different denier than the threads in the fill direction, wherein the threads in the warp direction are at least fifty percent larger in diameter than the thread in the fill direction, and wherein the containment covering fabric is positioned so that the warp yarns extend circumferentially around the fan case.

2. The turbine engine fan casing of claim 1 wherein the textile fabric comprises a balanced weave.

3. The turbine engine fan casing of claim 1 wherein the penetrable covering comprises an aramid fiber textile fabric.

4. The turbine engine fan casing of claim 3 wherein the aramid textile fabric comprises an uneven weave that contains differing thread deniers in a warp direction and a fill direction.

5. The turbine engine fan casing of claim 1 wherein the thread in the warp direction contains a thickness about five times the thickness of the thread in the fill direction.

6. The turbine engine fan casing of claim 1 wherein the containment covering fabric fill thread extends axially along the length of the fan casing.

7. A containment covering for a turbine engine fan casing, wherein the turbine engine fan casing acts to containing a separated blade fragment, the casing comprising a support case and a continuous penetrable covering, the containment covering comprising:
 a textile fabric containing threads in a warp direction and a fill direction, wherein the threads in the warp direction are of a different denier than the threads in the fill direction, wherein the threads in the warp direction are at least fifty percent larger in diameter than the thread in the fill direction, and wherein the containment covering fabric is positioned so that the warp yarns extend circumferentially around the fan case.

8. The containment covering of claim 7 wherein the textile fabric comprises a balanced weave.

9. The containment covering of claim 7 wherein the textile fabric further comprises aramid fibers.

10. The containment covering of claim 9 wherein the aramid textile fabric comprises a weave that contains differing thread deniers in a warp direction and a fill direction.

11. A method of containing a separated fan blade fragment in a turbine engine, the method comprising:
 providing a fan casing comprising a support case, a continuous penetrable covering, and a containment covering, wherein the containment covering comprises a textile fabric containing different denier threads in a warp direction than in a fill direction, wherein the threads in the warp direction are at least fifty percent larger in diameter than the thread in the fill direction, and wherein the containment covering fabric is positioned so that the warp yarns extend circumferentially around the fan case;
 preconditioning the separated blade segment to reduce its potential for inflicting damage; and
 intercepting the preconditioned fragment with the containment covering capable of resisting penetration by the preconditioned fragment;
 containing the preconditioned fragment within the fan casing.

12. The method of claim 11 wherein the containment covering further comprises at least five layers of the textile fabric wrapped circumferentially around the support case.

\* \* \* \* \*

UNITED STATES PATENT AND TRADEMARK OFFICE
CERTIFICATE OF CORRECTION

PATENT NO. : 7,517,184 B2  
APPLICATION NO. : 11/444562  
DATED : April 14, 2009  
INVENTOR(S) : Mark W. Costa et al.

It is certified that error appears in the above-identified patent and that said Letters Patent is hereby corrected as shown below:

Title Page, Item (54) and at Column 1, lines 1 and 2,

Delete "LOW DEFLECTION FAN COTAINMENT FABRIC"  
Insert --LOW DEFLECTION FAN CONTAINMENT FABRIC--

Title Page, Item (73) Assignee:

Delete "Unied Technology Corporation  
Insert --United Technology Corporation--

Col. 2, line 1,  
Delete "compromises"  
Insert --comprises--

Col. 3, line 66,  
Delete "diameter that"  
Insert --diameter than--

Col. 4, line 2,  
Delete "that the diameter"  
Insert --than the diameter--

Signed and Sealed this  
Twenty-second Day of February, 2011

David J. Kappos  
*Director of the United States Patent and Trademark Office*